Sept. 12, 1933.  N. A. OLSON  1,926,350
SPARE TIRE CARRIER FOR MOTOR DRIVEN VEHICLES
Filed May 12, 1930
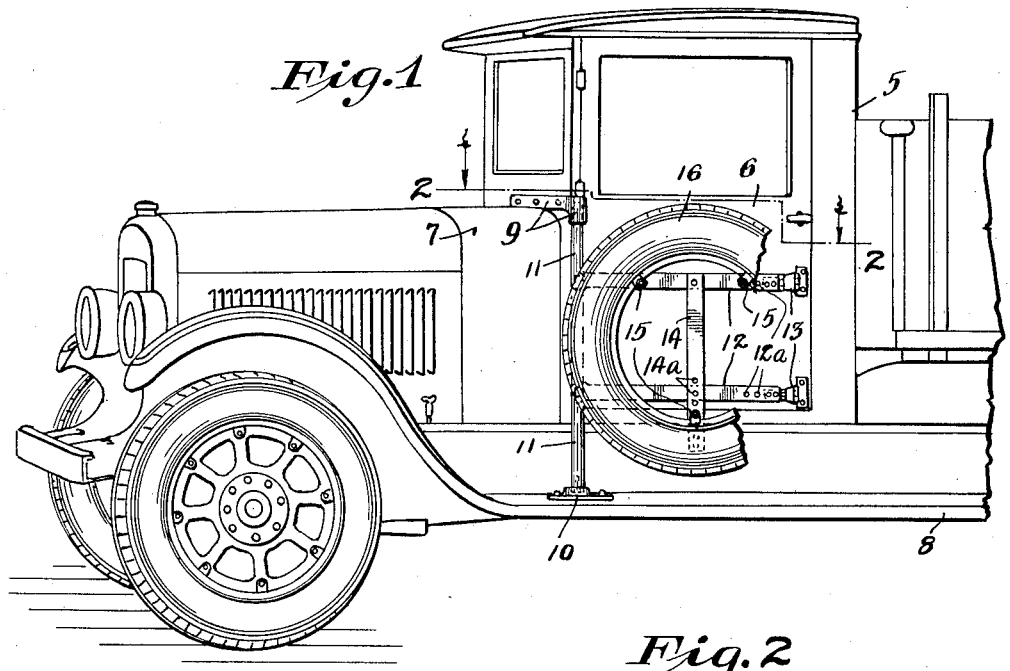
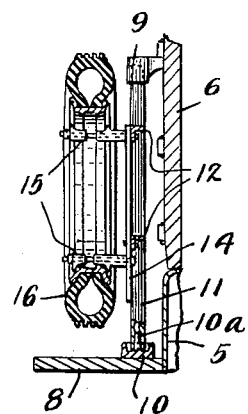
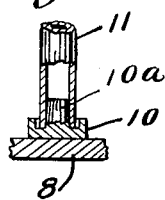
Inventor
Nels A. Olson
By his Attorneys
Williamson & Williamson Patented Sept. 12, 1933

1,926,350

UNITED STATES PATENT OFFICE 1,926,350

SPARE-TIRE CARRIER FOR MOTOR DRIVEN VEHICLES

Nels A. Olson, Scandia, Minn.

Application May 12, 1930. Serial No. 451,654

1 Claim. (Cl. 224—29)

My invention has for its object to provide an improved spare-tire carrier for motor driven vehicles; and to this end my invention consists of the novel devices and combinations of devices hereinafter described and pointed out in the claim.

My invention was especially designed for use on motor trucks. In most, or at least a great many, motor trucks now in general use, the driver's cab is located so far forward on the motor body that there is no room available for carrying a spare tire on the fender of the truck; and, as a result, the spare tires are usually carried underneath the rear end of the truck body or on the top of the driver's cab. Truck tires are usually heavy and it is quite a job to lift them up to or remove the same from the top of the cab.

If the spare tire is carried underneath the rear of the truck body, then, in many usages of the truck, the tire will become loaded with manure, sand or dirt injurious to the tire and which accumulation on the tire makes the tire dirty to handle.

By my invention, I am able to utilize the space available in front of the door of the cab while sustaining the weight of the tire and the tire-holder from the fixed parts of the vehicle body; and the structure and connections of the parts are of such a nature that the tire-carrier and the tire will swing with the door in the door opening and closing movements.

My invention, in its preferred form is illustrated in the accompanying drawing. In said drawing, like notations referring to like parts, Fig. 1 is a perspective view showing part of a motor truck equipped with my improved spare tire carrier;

Fig. 2 is a horizontal sectional view on the line 2—2 of Fig. 1, with some parts broken away, the full lines showing the vehicle door and the tire carrier in the door closed position and the dotted lines showing the same parts in the door opened position;

Fig. 3 is a vertical section on the line 3—3 of Fig. 2, and

Fig. 4 is a detail in vertical section, showing a part of the carrier post and the lower bearings for the same.

The numerals 5 and 6 represent respectively the body and the door of the cab of an ordinary truck. The numeral 7 represents the cowl and the numeral 8 the running board of the vehicle body. The door 6 is hinged to the forward upright of the cab body so that it opens by an outward and forward swinging motion in the customary way.

The numerals 9 and 10 represent respectively upper and lower bearings for a hollow post 11. The upper bearing 9 is rigidly secured to the cowl 7 of the vehicle body and the lower bearing 10 is rigidly secured to the running board 8 of the vehicle body with the bearing portions of the said two bearings in vertical alignment with each other. Post 11 is pivotally mounted in the said two bearings 9 and 10, with its lower end resting in the lower bearing and its upper end embraced by the upper bearing. The lower bearing is of cup-like shape on its upper surface and has a centering projection 10a which enters the lower end of the hollow post 11, as best shown in Fig. 4. The said bearings 9 and 10 are so applied to said fixed parts 7 and 8 of the truck body that the pivoted post 11 stands approximately in the same vertical plane as the hinges of the cab door 6.

As shown, the post 11 has formed integral therewith a pair of suitably spaced-apart tire-carrying arms 12, extending in a common plane at right angles to the post, so that when the post and the arms are in working position, the arms will be horizontal. Inasmuch as the arms 12 are formed integral with the post 11, they are of course rigid with the post at their inner ends, and will swing with the post. The opposite or outer ends of said arms 12 are conected to the forward edge of the cab door 6 by double or three-leaf hinges 13, as clearly shown in Figs. 1 and 2. The said two arms 12 are shown as connected by a vertical bar 14, which, on account of its function, may be called an adjustable tire holder, which adapts the tire carrier to take tires of different diameters, or to permit any tire to be vertically adjusted on the tire carrier. To this end the said vertical bar 14 has a series of holes 14a near its lower end through any of which may be applied the stem of an ordinary tire clamp 15 adapted to engage with the rim of the tire which is to be carried by the tire carrier. The upper member of the two horizontal tire-carrying arms 12 is also provided with a pair of tire clamps 15, which are also adapted to engage with the rim of the tire and cooperate with the previously named clamp to hold the tire 16, properly mounted on the tire carrier, as shown in the drawing.

The structure and mounting of my improved tire carrier being as above specified, it is obvious that the operation will be as follows:

The tire is carried in the space at the front of the cab door and the whole weight of the carrier and the tire is sustained from the car body, through the bearings 9 and 10, the post 11 and the horizontal arms 12 of the carrier. Then, when it is desired to open the cab door 6, this can be done in the usual way and the carrier will swing with the door into the dotted line position shown in Fig. 2 of the drawing.

The three-leafed or double hinges 13 serve to connect the carrier to the door in such a way that the carrier must move with the door in the door opening and closing movements, and, the hinges being double, permit the necessary sliding motion of the door relative to the carrier in the opening and closing movements of said parts. In other words, said three-leafed hinges are extensible in the horizontal plane, and being applied as above described, permit the door and the carrier to have a limited sliding motion relative to each other, sufficient to compensate for the difference in the relative locations of the pivots of the carrier and the hinge pivots of the door.

By actual usage of a full sized working specimen of my improved tire carrier herein disclosed, on a truck, I have demonstrated the practicability, efficiency and convenience of my improved tire carrier.

It will, of course, be understood, that changes can be made in the details of the structure and in the form and arrangement of the parts without departing from the spirit of my invention herein disclosed and claimed. For example it should be obvious that the post 11 might be stationary and the horizontal arms 12 might be distinct from the post 11 and be pivoted thereto between proper spacing collars and the action of the parts would be precisely the same.

It should be perhaps noted that the lower bearings 10 for the post 11 is preferably made of cup-shape and provided with the centrally disposed guiding projection 10a, for the lower end of the pipe 11, so as to afford a convenient place to hold oil for lubricating the bearing surfaces of the said parts.

The outer ends of the horizontal arms 12 of the tire carrier are shown as provided with a series of hinge screw holes 12a so that the outer leaf of the double or three part hinges can be adjusted on the said arms, as may be required, for adaptation to the doors of different cabs.

While my improved spare tire carrier herein disclosed and claimed was especially designed for use on motor driven trucks, it must of course be obvious that it might be used on other kinds of motor driven vehicles, such as passenger automobiles.

What is claimed is:—

The combination with a motor-driven vehicle, of a spare tire carrier comprising post-bearings secured to fixed parts of the vehicle body, a vertical post pivoted in and carried by said bearings, a pair of horizontal tire carrying arms each having its inner end rigid with said post, a double hinge connecting the outer end of each of said arms to the door of said vehicle, a vertical member intersecting and secured to the respective medial portions of said arms, and adjustable tire holding means including a pair of rim engaging clamps mounted for horizontally spaced adjustment with respect to each other on the upper one of said arms and a rim engaging clamp mounted on said vertical member for vertical adjustment relative to said first mentioned clamps.

NELS A. OLSON.